United States Patent [19]

Wakamatsu

[11] 4,271,728
[45] Jun. 9, 1981

[54] AUTOMATIC TRANSMISSION SYSTEM

[75] Inventor: Hisato Wakamatsu, Toyota, Japan

[73] Assignee: Nippon Soken, Inc., Nishio, Japan

[21] Appl. No.: 889,658

[22] Filed: Mar. 21, 1978

[30] Foreign Application Priority Data

Apr. 11, 1977 [JP] Japan .................. 52-41237

[51] Int. Cl.³ ............... B60K 41/08; B60K 20/00
[52] U.S. Cl. .................. 74/866; 74/473 R; 74/473 P; 74/850
[58] Field of Search ............ 74/866, 473 R, 473 P, 74/850, 856, 870, 877, 335, 336 R, DIG. 2, 867, 868, DIG. 6

[56] References Cited

U.S. PATENT DOCUMENTS

| | | | |
|---|---|---|---|
| 2,219,265 | 10/1940 | Castellano | 74/473 |
| 3,425,299 | 2/1969 | Fisher | 74/868 |
| 3,650,161 | 3/1972 | Ito et al. | 74/866 |
| 3,675,511 | 7/1972 | Wakamatsu et al. | 74/868 |
| 3,709,068 | 1/1973 | Mohri | 74/866 |
| 3,726,157 | 4/1973 | Marumo | 74/866 |
| 3,727,488 | 4/1973 | Wakamatsu | 74/866 |
| 3,738,196 | 6/1973 | Kubo et al. | 74/866 |
| 3,922,933 | 12/1975 | Sakai et al. | 74/473 R |
| 4,023,443 | 5/1977 | Usui et al. | 74/866 |

*Primary Examiner*—Leslie Braun
*Attorney, Agent, or Firm*—Cushman, Darby & Cushman

[57] ABSTRACT

An automatic transmission system including a fluid type transmission coupled to a shift control mechanism for selecting any one of a number of shift positions and having an electronic control circuit for controlling hydraulic-actuated units, is provided with a shift position detector positioned in the transmission body for detecting the position selected by the shift control mechanism. The electronic control circuit is positioned in the fluid source of the transmission.

2 Claims, 5 Drawing Figures

AUTOMATIC TRANSMISSION SYSTEM

FIELD OF THE INVENTION

The present invention relates to automatic transmission systems, and more particularly the invention relates to improvements in electrical automatic transmission systems installed in automobiles.

DESCRIPTION OF THE PRIOR ART

Figure 1:
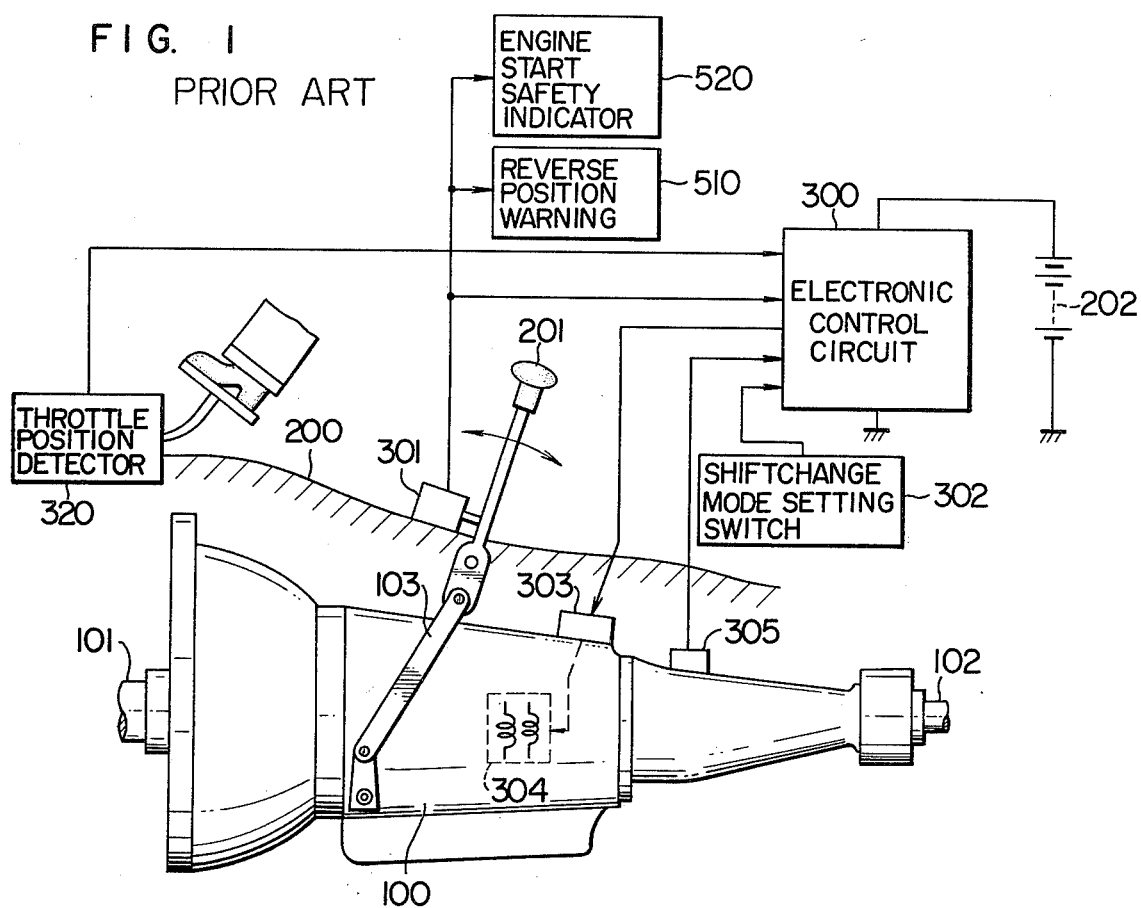
FIG. 1 is a schematic diagram showing the construction of a prior art electrical automatic transmission system.

FIG. 1 shows the overall construction of an electrical automatic transmission system with a hydraulic transmission given by way of example of the above-mentioned type of prior art system. In the Figure, numeral 200 designates the floor portion of the automobile body below which is mounted a hydraulic transmission body 100, and the transmission body 100 is operatively coupled by a rotatable link motion 103 to a shift lever 201 which is mounted on the vehicle floor 200 and connected to the manual shift valve in the hydraulic fluid circuit which is provided in the transmission body 100 and not shown so as to select shift positions. Disposed on the vehicle floor 200 is a shift position detector 301 adapted to detect the position selected by the shift lever 201. The shift position detector 301 is adapted to detect the different positions of the shift lever 201, i.e., the parking position (P), reverse position (R) and neutral position (N) and the positions (D, 2 and L) which provide three different shift patterns. The signals indicative of the detected positions are applied to an electronic control circuit 300 connected to a vehicle-mounted power source 202 and part of these signals are also applied respectively to a reverse position warning 510 and engine start safety indicator 520 mounted on the vehicle instrument panel which is not shown. Numeral 302 designates a shiftchange mode setting switch for setting a vehicle speed-shift point characteristic for gear shifting, 305 a vehicle speed detector, and 320 a throttle position detector, each of which supplies an information signal to the electronic control circuit 300.

The electronic control circuit 300 is of the type shown, for example, in U.S. Pat. No. 3,727,488, and it receives the output signals of the detectors 301, 305 and 320 to determine a transmission ratio between an input shaft 101 driven by the vehicle engine shaft and an output shaft 102 for driving the vehicle wheels and generate the corresponding output signal. This output signal is applied by way of a connector 303 provided between the transmission body 100 and the control circuit 300 to electromagnetic valves 304 disposed inside the transmission body 100.

It has been the recent trend with automobiles to loosely couple the vehicle body to the drive system, e.g., the transmission body 100 is fitted loosely to the vehicle floor 200 for vibration and noise preventive purposes. Due to this tendency, there are cases where the actual shift position in the transmission body 100 will not agree with the position selected by the shift lever 201 or the shift position detected by the shift position detector 301. For example, there will be a case where despite the fact that the actual shift position in the transmission body is the drive position (D) or the reverse position (R), the engine start safety indicator 520 gives an indication that the shift position is the parking position (P) or the neutral position (N). If the driver starts the engine by looking at the erroneous indication on the engine start safety indicator 520, it will be extremely dangerous since the vehicle starts moving as soon as the engine is started. There will be no difference in this respect even if the electronic control circuit 300 controls in response to the output of the detector 301 in such a manner that the engine is started only in the particular shift positions, that is, the parking position (P) or the neutral position (N). Moreover, the electric shift control by the electronic control circuit 300 also becomes inaccurate.

SUMMARY OF THE INVENTION

It is therefore a first object of the present invention to provide an automatic transmission system wherein a shift position detector is mounted in the transmission body, thereby ensuring accurate shift position detection.

It is a second object of the invention to provide an automatic transmission system wherein an electronic control circuit is positioned in the fluid source of a fluid type transmission, thereby simplifying the associated electric wiring.

In accordance with the first invention, there is a great advantage that it is possible to completely prevent the occurrence of a deviation phenomenon between the actual shift position and the position detected by a shift position detector.

In accordance with the second invention, there is a great advantage that the electric wiring interconnecting a shift position detector and an electronic control circuit is collectively arranged in the transmission body and the electronic control circuit is protected to provide it with heat resisting properties, thereby simplifying the electric wiring in and around the transmission and improving the operating stability.

DESCRIPTION OF THE PREFERRED EMBODIMENT

Figure 2:
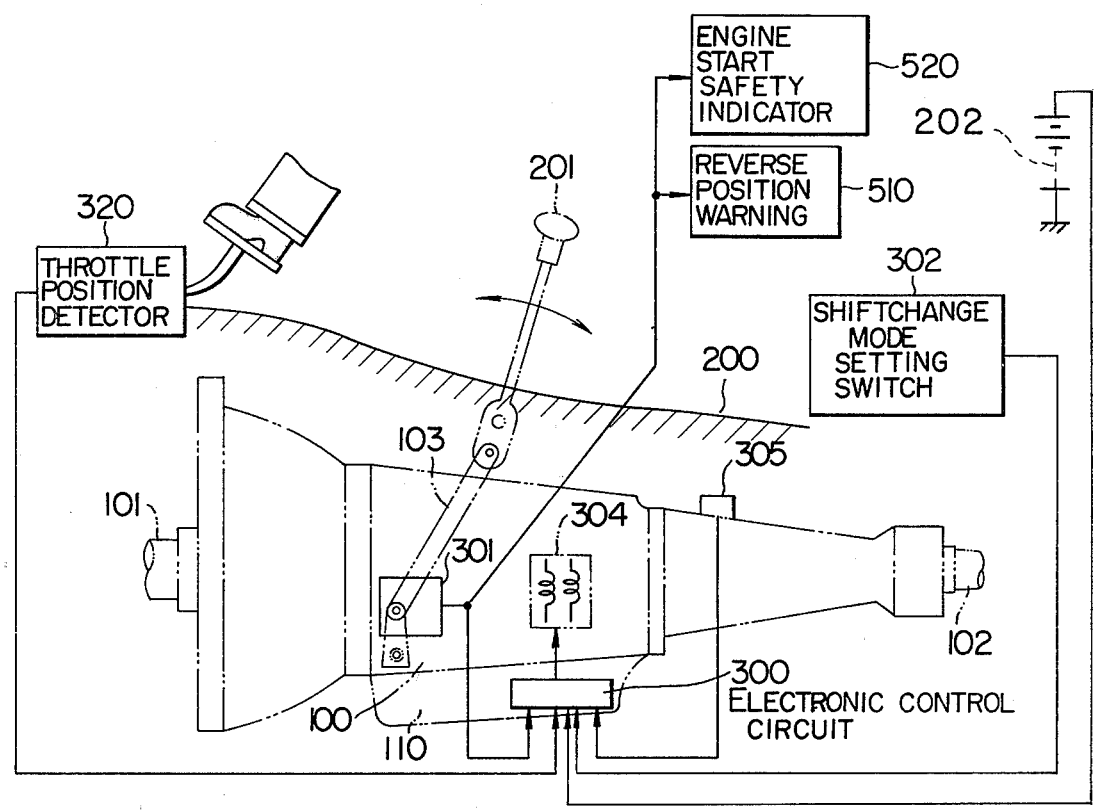
FIG. 2 is a schematic diagram showing the construction of an embodiment of the invention.

The present invention will now be described with reference to the illustrated embodiment. The automatic gear shifting operation itself does not constitute a positive feature of this invention and the description of the gear shifting operation will be made only briefly. Referring to FIG. 2 illustrating schematically the overall construction of an embodiment of the invention, the mechanical parts of the embodiment, i.e., a hydraulic transmission body (transmission housing) 100, a vehicle floor portion 200, a shift lever 201 mounted on the vehicle floor portion 200 and connected to the manual shift valve in the hydraulic fluid circuit which is disposed in the transmission body 100 and not shown for shift pattern selecting purposes, a link motion 103, etc., are the same with the counterparts in the prior art system shown in FIG. 1. In this embodiment, the shift lever 201 and the link motion 103 constitute a shift control mechanism, whereby the shift lever 201 can be moved by the driver to provide, for example, the parking position (P), neutral position (N), reverse position (R) and other positions (D, 2 and L) which give different shift patterns. Also a shiftchange mode setting switch 302, vehicle speed detector 305, throttle position detector 320, electronic control circuit 300, vehicle-mounted power source 202, reverse position warning 510 and engine start safety indicator 520 are identical in construction with the counterparts in the prior art system shown in FIG. 1. With the embodiment shown in FIG. 2, a first point to be noted is the fact that the electronic control circuit 300 adapted to control electromagnetic valves 304 in response to the output signals of a shift position detector 301, the shiftchange mode setting switch 302, the vehicle speed detector 305 and the throttle position detector 320, is positioned in an oil pan 110 disposed in the lower portion of the transmission body 100. A second point to be noted is the fact that the shift position detector 301 adapted to detect the actual shift position in the transmission body 100 is positioned within the transmission body 100.

Figure 3:
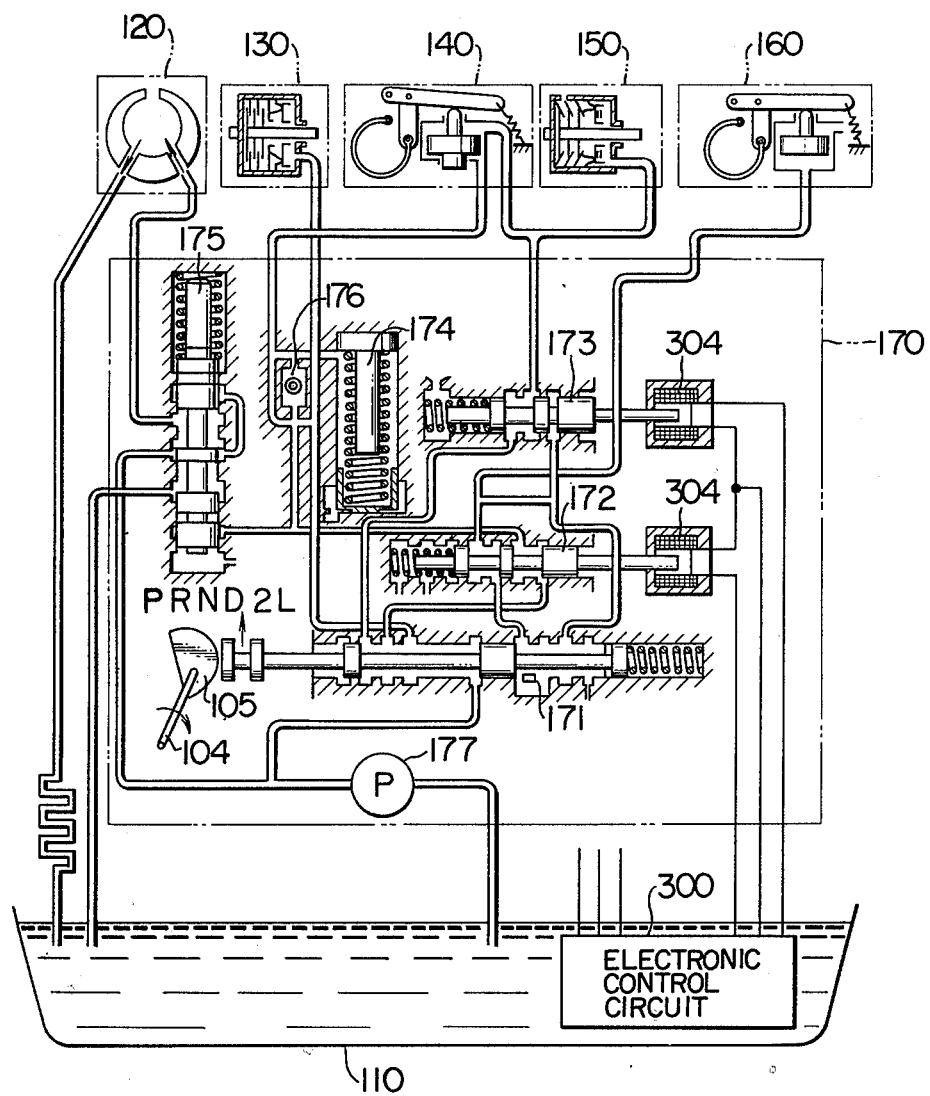
FIG. 3 is a schematic diagram showing the internal construction of the transmission body shown in FIG. 2.

As shown in FIG. 3, the transmission body 100 includes the oil pan 110, a torque converter 120, a front clutch 130, a front brake 140, a rear clutch 150, a rear brake 160, a hydraulic fluid circuit 170 and a transmission gear unit which is not shown. The hydraulic fluid circuit 170 includes a manual shift valve 171, solenoid valves 172 and 173, an accumulator 174, a pressure regulator 175, a check valve 176 and a pump 177. As shown in FIG. 3, the electronic control circuit 300 is positioned in the oil of the oil pan 110 and connected through power and signal lines to the electromagnetic valves 304 operatively coupled to the solenoid valves 172 and 173. When placing the electronic control circuit 300 in the oil pan 110, a group of devices constituting the individual electric circuits are encapsulated with a silicone material to ensure electrical insulation and humidity resistance for the devices. The manual shift valve 171 is operatively coupled to a cam shaft 104 adapted to be rotated by the shift lever 201 and the link motion 103 shown in FIG. 2 and a cam 105. When the manual shift valve 171 is controlled to the shift position selected by the shift lever 201, the hydraulic oil circuits leading from the pump 177 to the solenoid valves 172 and 173, etc., are changed. In response to the energization of the electromagnetic valves 304, the seleniod valves 172 and 173 change the connections of the oil circuits leading from the manual valve 171 to the front brake 140, the rear clutch 150 and the rear brake 160 to change the transmission ratio of the transmission gear unit.

Figure 4:
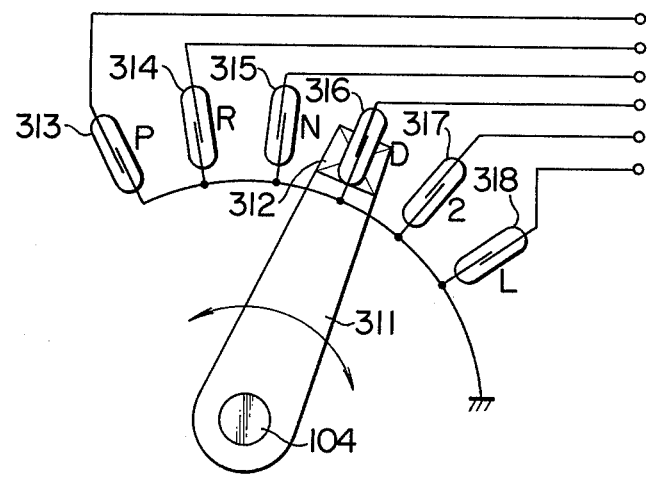
FIG. 4 is a schematic diagram showing the construction of the shift position detector 301 shown in FIG. 2.

As shown in FIG. 4, the shift position detector 301 includes an actuating bar 311 fixedly mounted on the rotatable cam shaft 104 shown in FIG. 3, and a permanent magnet 312 is fixed rigidly to the forward end of the actuating bar 311. Reed switches 313, 314, 315, 316, 317 and 318 are circularly arranged and fixedly mounted on nonmagnetic holding members or the like at the positions corresponding to the rotary positions of the actuating bar 311, and consequently one of the reed switches corresponding to the rotation of the actuation bar 311 is brought into an open or closed condition which is different from that of the other reed switches. In the illustrated position, only the reed switch 316 is closed and the other reed switches are all opened. In response to the operation of the associated reed switches, the shift position (P) selects the parking position, the shift position (R) the reverse position and the shift position (N) the neutral position. The shift positions (D), (2) and (L) correspond to the positions in which automatic gear shifting is effected with different shift patterns, namely, (D) selects the position in which the ordinary automatic shifts take place, (2) the position in which only the automatic shifts between the first and second speeds take place and (L) the position in which the first speed is maintained and no shifts are allowed. The output signals of the reed switches in the shift position detector 301 are suitably applied through the corresponding signal lines to the electronic control circuit 300, the reverse position warning 510 and the engine start safety indicator 520. Since the shift position detector 301 detects the shift position of the manual shift valve 171 in the vicinity thereof, the actual shift position can be accurately detected. As a result, the indication of the shift positions by the indicators 510 and 520 as well as the control of the energization of the electromagnetic valves 304 by the electronic control circuit 300 can be accomplished accurately. Moreover, by virtue of the fact that the electronic control circuit 300 is positioned in the oil pan 110, the electric wiring from the shift position detector 301 to the electronic control circuit 300 is simplified. Preferably the reed switches 313 to 318 in the shift position detector 301 are positioned in the transmission body 100 for simplifying the electric wiring.

Figure 5:
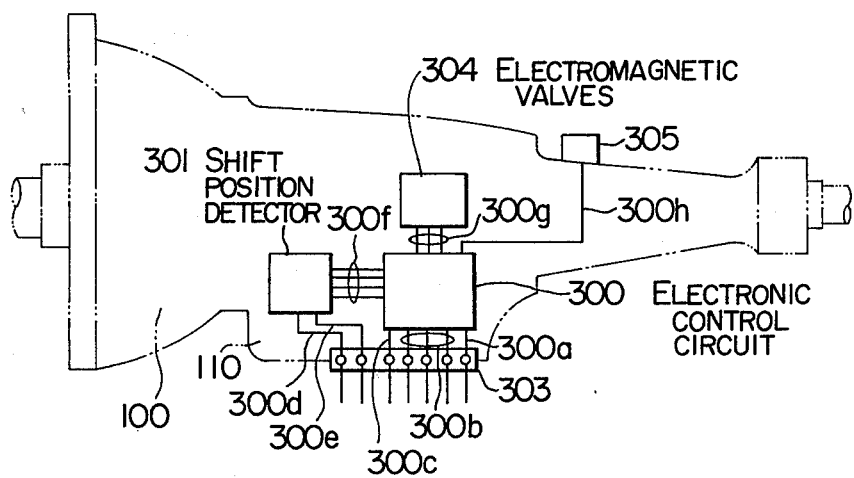
FIG. 5 is a schematic diagram showing in detail the electric connections of the embodiment shown in FIG. 2.

As will be seen from FIG. 5, the electric wiring in the vicinity of the transmission body 100 includes a power supply line 300a from a power source 202, signal lines 300b and 300c for receiving the information signals from the throttle position detector 320 and the shiftchange mode setting switch 302 respectively and signal lines 300d and 300e for transmitting the engine start safety signal and reverse position signal respectively from the shift position detector 301, and these lines are connected to an electric connector 303 provided on the transmission body 100. On the other hand, signal lines 300f from the shift position detector 301, signal lines 300g to the electromagnetic valves 304 and a signal line 300h from the vehicle speed detector 305 are connected to the electronic control circuit 300 within the transmission body 100 without through the connector 303.

What is claimed is:
1. In an electronic automatic transmission system for automobiles having
control means for controlling the transmission ratio between an engine and wheels of an automobile in response to a fluid applied thereto,
a fluid source,
first valve means manually and remotely shifted by a shift lever located on the upper side of a floor of said automobile for changing the application mode of said fluid applied from said fluid source to said control means,
second valve means electromagnetically shifted for changing the application mode of said fluid applied from said first valve means to said control means,
a transmission body located under the floor of said automobile for encasing said control means, said fluid source, said first valve means and said second valve means therein, and
an electronic circuit for controlling the shift position of said second valve means in response to at least the shift position of said first valve means,
the improvement comprising:

a shift position detector being positioned within said transmission body for directly detecting the shift position of said first valve means and having a movable member and plurality of signal generating members, said movable member being coupled to said first valve means to be moved in association therewith, and said signal generating members being fixedly supported within said transmission body and effective to detect the position of said movable member indicative of the shift position of said first valve means, whereby the detected shift position is not affected by the relative position of the floor of said automobile and said transmission body.

2. An electronic automatic transmission system according to claim 1, wherein said electronic circuit is positioned within said fluid source, interconnection between said electronic circuit and said shift position detector and said second valve means being completed by signal transmission lines within said transmission body.

* * * * *